United States Patent [19]

Eichhorn

[11] Patent Number: 4,739,498
[45] Date of Patent: Apr. 19, 1988

[54] ARRANGEMENT FOR THE AUTOMATIC RECONFIGURATION OF AN INTACT EQUIPMENT COMBINATION

[75] Inventor: Edelbert Eichhorn, Deisenhofen, Fed. Rep. of Germany

[73] Assignee: Messerschmitt-Bölkow-Blohm GmbH

[21] Appl. No.: 770,687

[22] Filed: Aug. 29, 1985

[30] Foreign Application Priority Data

Aug. 31, 1984 [DE] Fed. Rep. of Germany ....... 3432165

[51] Int. Cl.[4] .......................... G11C 7/02; G11C 7/00; H04L 5/04; H04J 15/00
[52] U.S. Cl. .................... 365/200; 365/210; 371/11
[58] Field of Search .................. 365/200, 210, 49; 371/11, 10

[56] References Cited

U.S. PATENT DOCUMENTS 4,345,319 8/1982 Bernardini et al. ................. 365/200
4,506,364 3/1985 Aichelman, Jr. et al. ............ 371/10

OTHER PUBLICATIONS

Satya et al., "Electronic Reorganization of Memory for Handling Uncorrectable Memory Errors", vol. 22, No. 12, IBM Technical Disclosure Bulletin, pp. 5378-5380.

Primary Examiner—Terrell W. Fears
Assistant Examiner—Melissa J. Koval
Attorney, Agent, or Firm—Toren, McGeady & Associates

[57] ABSTRACT

An arrangement switches from a defective device of a multi-device system to a redundant duplicate device by assigning a non-volatile memory to each device. Each memory has a single read line to a logic circuit that turns on a device or its duplicate depending upon the memory status. An error detector monitors the devices to activate appropriate memory circuits and logic circuits upon detection of a defect in a particular device.

4 Claims, 4 Drawing Sheets

ARRANGEMENT FOR THE AUTOMATIC RECONFIGURATION OF AN INTACT EQUIPMENT COMBINATION

BACKGROUND OF THE INVENTION

This invention relates to systems which incorporate redundant backups, and particularly, to arrangements that automatically respond to defect in one of a number of singly redundant equipment groups of devices that make up a system by reconfiguring the combination.

Such redundant groups of devices (or equipment groups) occur, for example, in space vehicles where it is important to make the system as fail-safe as possible. In a single redundancy system, each device (or piece of equipment) is present in duplicate. The devices may be in the form of ground sensors or their evaluating circuits, control apparatuses for firing of attitude control nozzles, or instruments for measuring the rotary speed of inertial wheels. If one of these devices fails, a redundant device must operate as quickly as possible. This becomes a problem, for example, where a satellite can make radio contact with a ground station only during certain limited time spans of its orbit. Between these time spans, when radio contact is impossible, the system must be certain to stabilize satellite functions at least enough not to endanger the mission. Adequate attitude control is of extreme importance in this connection. If possible, the satellite should not be completely lose its desired attitude. It should not tumble uncontrollably, nor must it spin too fast due to interference moments. The excess centrifugal forces caused by such fast spins could endanger the solar panels which extend from the space vehicle. Moreover, the speeds of the flywheels should not exceed their upper limits too much. Defects affecting these functions would endanger the entire mission of a satellite.

Therefore, the problem is to switch immediately to another intact device if one currently active device fails. Normally, at least the devices in operation are checked continuously by monitoring characteristic function parameters. For reasons of cost, this check does not have to cover all of the devices, it being sufficient to monitor only certain particularly critical function parameters. However, this raises a difficulty. A function parameter drifting out of a specific permissible range does not always indicate that the device furnishing this function parameter is in itself defective. The defect may occur in another device which is not be monitored. This can only be determined by more thorough and time-consuming trouble shooting which is possible only with the aid of the ground station. Accordingly, one cannot solve this problem by simply shutting off the device reporting the fault and replacing it with its redundant partner, because the device itself may not necessarily be defective at all.

An object of the invention is to overcome these difficulties.

Another object of the invention is to provide an arrangement which responds to a defect by turning on a definitely intact combination of devices to maintain the satellite in a stabilized attitude until the next radio contact with the ground station so that the actual error source can be sought and the defective device identified.

SUMMARY OF THE INVENTION

According to the feature of the invention, these objects are attained by associating each of two groups of devices with an activatable memory circuit containing one non-volatile binary memory for each pair of devices; associating each memory with a read line and a pair of set lines, one of the latter of which is connected to the individual memory only and the other one of which is also connected to the other memory associated with the same pair of devices; connecting each read line to an individual logic circuit which is activatable together with the memory circuit to furnish ON commands, in response to the memory status, to the one or the other of the pair of devices associated with the respective memory; associating with each memory circuit at least one reset line for itself only and at least one other reset line for itself and the other memory circuit; and having at least one error detector to monitor the equipment combination in an ON position and to activate the inactive memory circuit and the logic circuits associated with it when a defect occurs.

Accordingly, the invention provides each group of devices with a memory circuit for its own purposes and also for redundancy. Each memory circuit contains binary memories which, can have only two memory states. Logic circuits succeeding the memories see to it that when the associated memory circuit activated, the one or the other device of the associated pair is turned on, depending on the memory status of the memory preceding the particular logic circuit. The memories have previously been set so that an intact device is switched in any case. If the error detector reports a defect in the combination of devices turned on by the memory cicuit which is active at the moment, this memory circuit is deactivated and the hitherto inactive other memory circuit is activated. The latter now turns on another, intact combination of devices in accordance with its memory state.

The invention achieves an enormous reliability increase for satellite missions by extremely simple means, especially without much computer sophistication, thus making possible the use of fewer ground stations and reducing down times. However, the invention is applicable not only to space travel, but wherever simply redundant equipment systems are present which while being constantly monitored regarding particularly critical function parameters, can undergo thorough trouble shooting ony at specific time intervals.

These and other features of the invention are pointed out in the claims. Other objects and advantages of the invention will become evident from the following detailed description when read in light of the accompanying drawings.

DETAILED DESCRIPTION OF PREFERRED EMBODIMENTS

Figure 1:
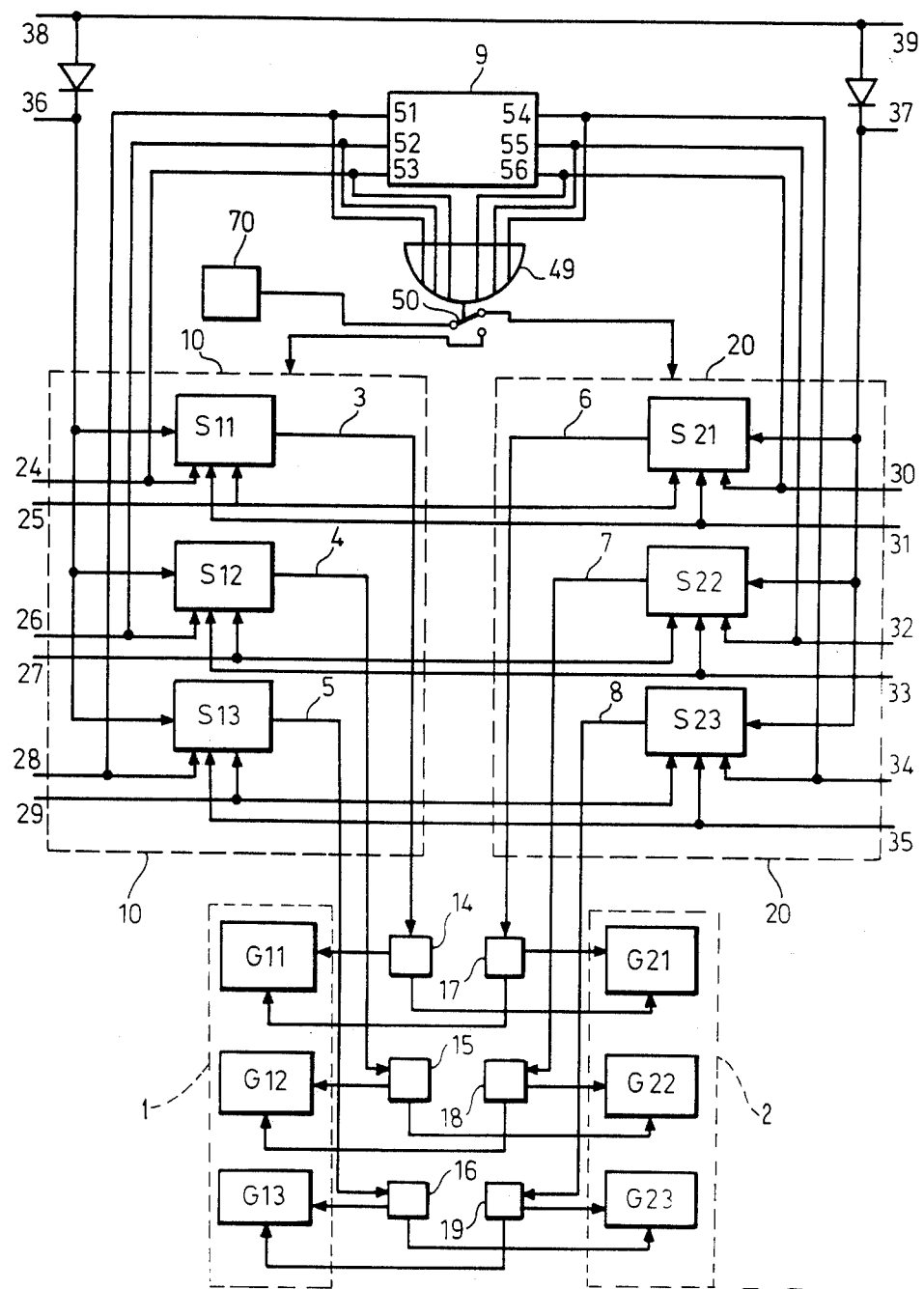
FIG. 1 is a block diagram of an arrangement embodying the invention using three pairs of devices.

In FIG. 1, a group of devices (i.e. a device group or equipment group) collectively designated 1 includes three device (i.e. pieces of equipment) G11, G12, and G13 and a device or equipment group 2 includes three devices G21, G22, and G23, identical to the devices G11, G12 and G13. Each of the two identical devices such as G11 and G21, and G22, and G13 and G23 form a pair of devices (i.e. a device pair or an equipment pair). For simplicity, the term device and piece of equipment are used interchangeably. Normally, only one group of devices, such as group 1 containing devices G11, G12, and G13 is activated.

Coordinated with the two device groups 1 and 2 are two respective memory circuits 10 and 20, each composed respectively of three non-volatile binary memoreis S11, S12, S13, and S21, S22, and S23. Respective read lines 3, 4, 5, and 6, 7, 8, connect the various memories to logic circuits 14, 15, 16, and 17, 18, 19. The memory circuits 10, 20 as well as the logic circuits associated with them are activated from an error detector 9 which has six outputs 51 to 56 associated with the individual devices G11 to G23. The error detector 9 monitors critical parameters of the devices whch have been activated and applies a signal to its respective associated output when a defect occurs. This signal reaches an OR gate 49. The output signal appearing at its output causes switching from the memory circuit which is active at that moment to the memory circuit which is inactive at that moment. This is accomplished by a switch 50. Also activated with the newly activated memory circuit are the logic circuits associated with it.

Associated with the various memories S11 to S23 are respective set lines 24, 26, 28, 30, 32 and 34 each leading only to these memories. Set lines 25, 27, 29, 31, 33, and 35 each go to two memories, e.g. S11 and S21, belonging to the different memory circuits 10 or 20 and associated with one pair of devices such as G11 and G21, or G12 and G22, etc. The first mentioned set lines 24, 26, 28, 30, 32, and 34 are also connected to the outputs 51 to 56 of the error detector 9. Reset line 36 is jointly associated with the memories S11 to S13 of the memory circuit 10, and is able to reset the memories of the associated memory circuit 10. Reset line 37 is jointly associated with the memories S21 to S23 to the memory circuit 20, and is able to reset the memories of the associated memory circuit 20. Access to all memories of both memory circuits 10 and 20 jointly is made possible through additional reset lines 38 and 39.

In a satellite, all set and reset lines are connected to the existing telecommand facilities so that the memories can be both set and reset by commands from the ground station. As will become clear later with references to FIG. 3 it is also possible to read the memory status from the ground station.

Figure 2:
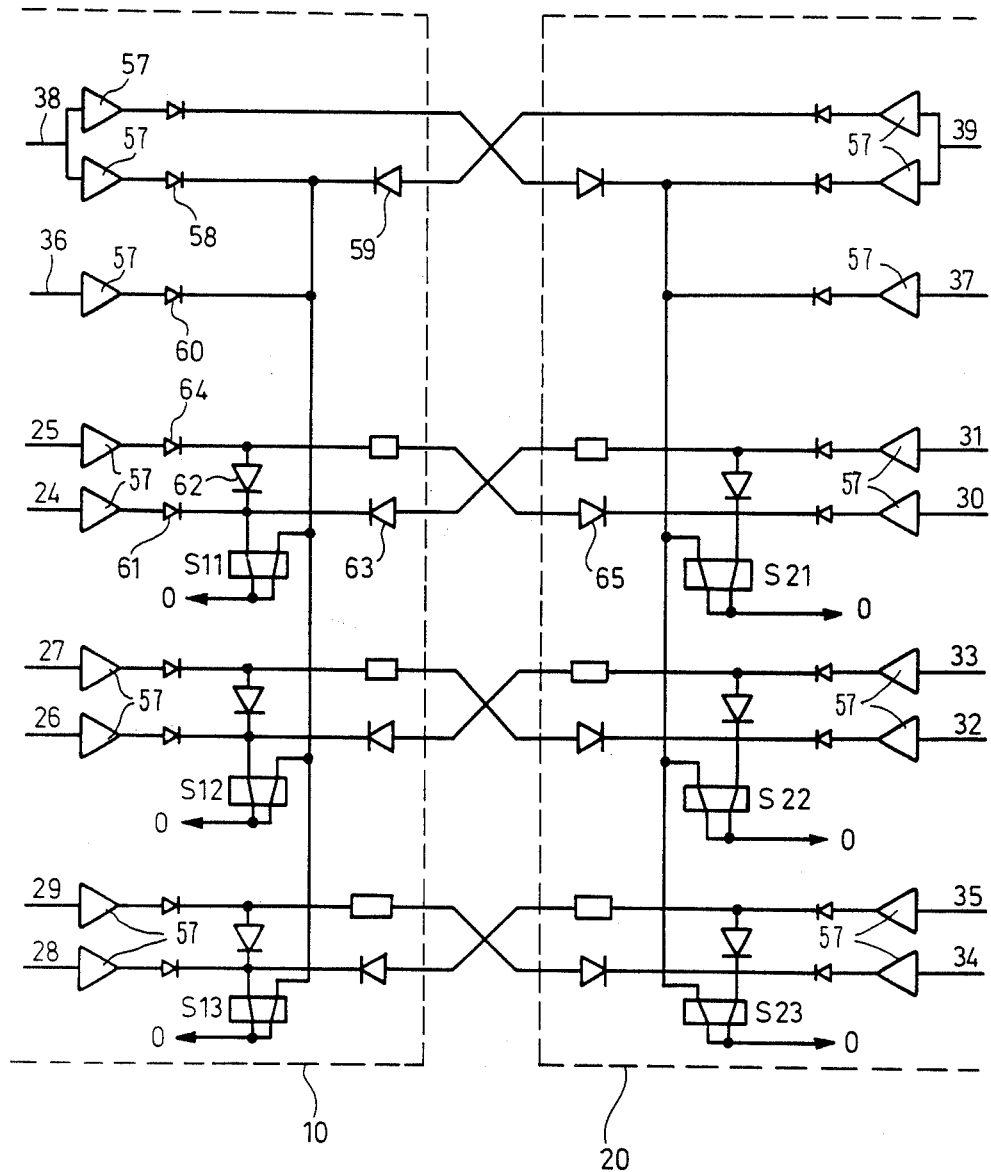
FIG. 2 illustrates the two memory circuits of the arrangement of FIG. 1.

FIG. 2 illustrates the input ends of the two memory circuits 10 and 20. The respective set lines 24 to 35 as well as the reset lines 36, 37, 38, and 39, correspond to those shown in FIG. 1. Drivers or amplifiers 57 convert the set and reset commands into current pulses of sufficient level to be able to switch the memories S11 to S13 and S21 to S23 which are constructed as relays. Hence, the relays are also identified as S11 to S13 and S21 to S23. The relays S11 to S13 and S21 to S23 contain two coils each, and depending on which one of these coils receive a current pulse, a switch contact, forming the "outputs" of the relays and shown in FIG. 3, opens or closes. These two switch contact positions correspond to the two possible memory states. The two coils of each relay receive positive current pulses from the drivers 57 and their other ends are connected to zero potential. Diodes, e.g. 58, 59, 60, forward the incoming set or reset commands via the correct lines. For instance, while a reset command arriving via the reset line 36 can pass the diode 60 and thus, reach all three memories S11 to S13 to reset them, the diode 59 prevents it from getting to the memory circuit 20. By the same token, the diodes 62 and 63 allow a set command arriving via the set line 24 only to pass the diode 61 and set the memory S11. On the other hand, due to the polarities of the diodes 64, 62, and 65, a set command arriving via the set line 25 is in a position to set not only the memory S11 of the memory circuit 10, but also the memory S21 of the other memory circuit 20.

Figure 3:
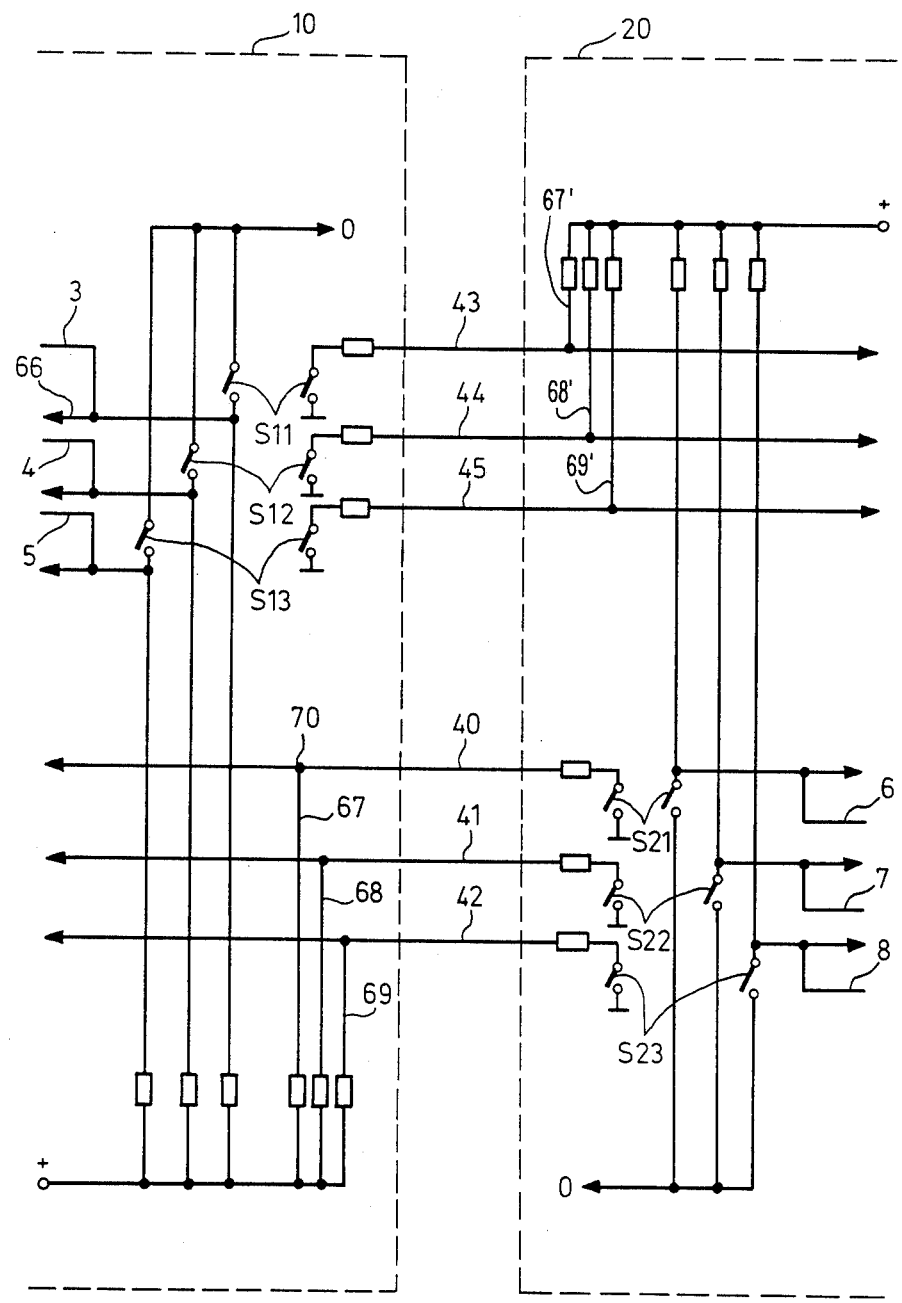
FIG. 3 shows the output components of the memory circuits associated with read lines.

FIG. 3 shows the output components of the memory circuits 10 and 20. On the output end, the relays S11 to S13 and S21 to S23, forming the memories, each contain two switch contacts both of which operate jointly in the same manner, both assuming the same switched status at the same time. However, in principle, it is also possible to use only one switch contact for each relay S11 to S13 and S21 to S23. When a memory circuit is activated, its voltage supply is also activated. Hence, in the case of the memory circuit 10, for instance, the read line 3 carries a positive potential when the switch contacts of relay S11 are open and zero potential when they are closed. These two potentials correspond to the logic 1 and 0 which are processed by the logic circuit 14 connected to the read line 3 (See also FIG. 4). This applies analogously to the other memories or relays shown in FIG. 3 and to their output switch contacts and read lines.

Still other lines 66 branch off the read lines 3 to 8 and go to the telemetry transmitter by means of which the memory states can be read from the ground station. The switch contacts of the memories S11 to S13 are connected to additional read lines 43, 44, and 45 to make the memory states of the memory circuit 10 also readable from the other memory circuit 20. Similarly, additional read lines 40, 41, and 42 are connected to the contact switches S21, S22 and S23 and allow reading of the memory states of the memory circuit 20 from the memory circuit 10. The read lines 40 to 45 are also connected to the telemetry transmitter.

If the voltage supply of one memory circuit, say, the memory circuit 10 is activated, the system makes it possible for the ground station to read not only its memory states, but also the memory states of the other memory circuit, say 20, although the latter's voltage supply is not activated. For this purpose, lines 67, 68, and 69 in the memory circuit 10 connect the switch contacts of the memories S21 to S23 associated with the read lines 40 to 42 to the voltage supply of the memory circuit 10. Thus, the junction 70 of the read line 40 and line 67 carries a positive potential corresponding to the voltage supply if the associated switch contact is open and a considerably lower positive potential as soon as the switch contact is closed. Similarly, lines 67', 68', and 69' in the circuit 20 connect the switch contacts of the memories S11 to S13, associated with the read lines 43 to 45, to the voltage supply of the memory circuit 20.

The activation of one of the memory circuits 10 or 20 by a voltage supply V in FIG. 1, means that they are connected to the voltage supply both on the input end, see the drivers 57 in FIG. 2 and on the output end, see FIG. 3, with the other memory circuit being separated from this voltage supply.

Figure 4:
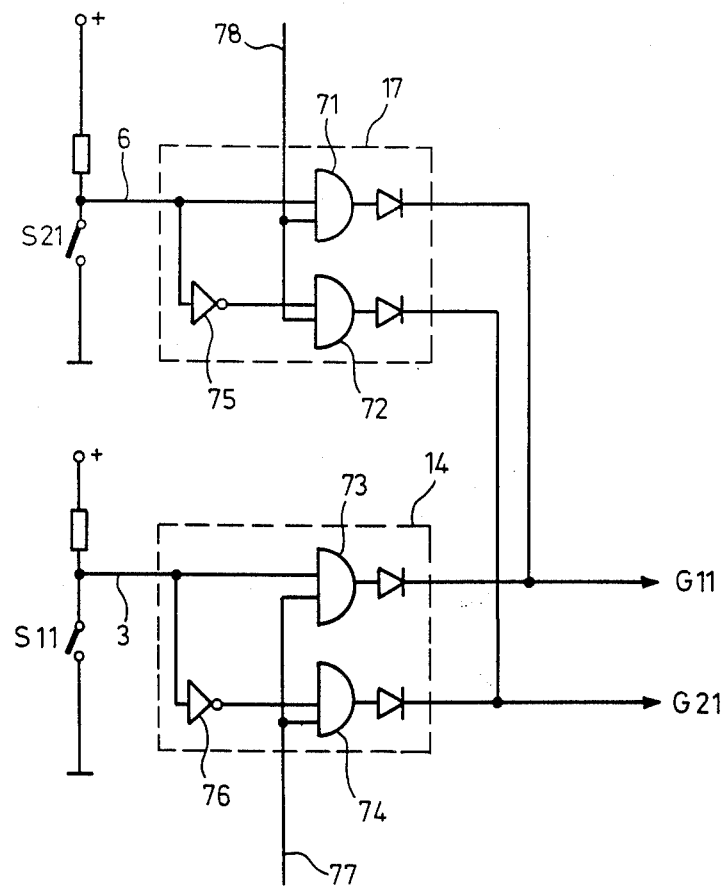
FIG. 4 illustrates a pair of logic circuits associated with a pair of devices.

FIG. 4 shows details of the logic circuits 14 and 17 which belong to the device pair G11 and G21 in FIG. 1. The logic circuits 14 and 17 are representative of the logic circuits 15, 18 and 16, 19. As shown, the logic circuits include AND gates 71 to 74 and inverters 75, 76. Voltage supply lines 77 and 78 selectively activate the logic circuit 14 or the logic circuit 17 by applying a logic signal 7 to the respective inputs of the AND gates 73 and 74, or 71 and 72. Now, if the logic circuit 14, for instance, is activated in this manner, an open output switch contact of memory S11 connected to the read line 3 also applies a logic signal 7 to the other input of the AND gate 73 and switches on the device G11. The other input of the AND gate 74 then carries a logic signal 0 because of the preceding inverter 76. Hence, no output signal originates at the output of this AND gate 74, and the associated device G21 remains shut off. The memory status of memory S11, represented by the open switch contact, thus corresponds to a command to turn on the device G11.

Conversely, the memory status of memory S11 being represented by a closed switch contact constitutes a command to turn on the device G21. This readily follows from the structure in FIG. 4.

If the voltage supply line 78 supplies a logic 1 signal to one of the inputs of each of the AND gates 71 and 72 to activate the logic circuit 17 instead of the logic circuit 14, an analogous result occurs. That is, an open output switch in the memory S21 causes the read lines 6 to apply a logic 1 signal to the other input of AND gate 71 and a logic 0 signal to the other input of the AND gate 72. Here too, an open switch contact switches on the device G11, and as analogously, a closed switch contact switches on the devices G21. Therefore, the coordination of switch contact position or memory status with the device to be switched on of the respective pairs of devices, or equipment pairs, is the same in both cases.

The aforementioned structure offers the following functional possibilities. First, the ground station can specify an automatic turn-on sequence for a desired device or equipment combination. For example, if the ground station wishes to turn on the device G11, G12, and G13 at the beginning, it would be necessary to bring the memories S11 to S13 in to a corresponding memory status, i.e., as shown in FIG. 4, to open the output switch contacts of the respective relays. This open switch contact position can be accomplished by a reset command over the reset line 36. Hoewver, before this, one need give the set lines 25, 27, and 29 set commands which close the switch contacts of the relays in the memories S11 to S13 of the memory circuit 11 as well as the memories S21 to S23 of the memory circuit 20. The reason for this will become clear hereafter. A subsequent reset command from the reset line 36 opens the switches of the relays associated with the memories S11 to S13 so the memory circuit 10 turns on the devices G11 to G13. Now if a defect occurs in this combination of devices, error detector 9 activates memory circuit 20 through the OR gate 49. In the memory circuit 20 the switch contact of the relays associated with the memories S21 to S23 are closed because of the aforementioned set commands. As can be seen in FIG. 4, this condition corresponds to a command to turn on the devices G21 to G23.

Simultaneous with the switch command given by an output signal at one of the three outputs 51 to 53 of the error detector 9, a set command from the same output goes to the appropriate one of the three set lines 24, 26, and 28. This now brings the associated memory, or the relay forming it, into the other condition, i.e., a closed switch contact state. This confirms that the error detector 9 has received the fault report from the device associated with this memory. During the next contact with the ground station the respective information can be read. This may be helpful for subsequent trouble shooting.

When the ground station has found the faulty device by conventional methods, which are not discussed here in detail, the corresonding information must be entered in the memory circuits. For example, if the device G12 has been found defective, it must in no event be turned on again; of this equipment pair only the device G22 may be released for turn-on. Therefore, the memories S12 and S22 must be set appropriately, i.e., their output switch contacts must be closed.

Since the memory circuit 20 is now activated, only it can receive the respective telecommand signals. The status of the activated combination of devices is not affected thereby. First, the reset line 39 issues a reset command which resets all memories S11 to S23, i.e., opens the relay contacts. Then, the set line 33 carries a set command and set the memories S12 to S22, i.e., close the relay contacts. A reset command over the reset line 37 again resets the memory S22 while only the memory S12 remains set. The memory circuit 20 is now prepared for an error report which comes from the error detector 9 via one of these lines 30, 32, or 34. Then the memory circuit 10 is reactivated through which the intact devices G11, G22, and G13 are now turned on due to the previously set memory S12 and the still reset memories S11 and S13.

Once the fault in the previously turned-on device combination G21, G22, and G23 has been found, it must be stored. If the device G21 is defective, the memories S11 and S21 must be reset so that only the device G11 can be turned on. Towards this end the reset line 38 issues a reset command which resets all memories S11 to S23, followed by a set command over the set lines 27 and 29 and a reset command over the reset line 36. This resets all memories of the memory circuit 10 and the latter is prepared for a new error report. On the other hand, upon the activation of the memory circuit 20, the intact devices G22 and G23 as well as G11 are placed in operation by it. Now only one equipment pair is still intact, namely G13 and G23.

The error detector 9 may also be redundant. If a fault is reported in it, the corresponding inactive redundant one is activated.

The term redundance is always understood above to mean cold redundancy. In the stabilized position for which one strives upon the detection of a defect, it is necessary that a satellite's solar panels continue to be oriented toward the sun and the directional antennas toward the Earth.

The term intact is used in the sense of properly operative or being free of faults or defects. Fault is used in the sense of defect.

After each current pulse into one or the other coil of a relay such as S11 to S23, the two switch contacts belonging to that relay simultaneously open or close, depending on which coil has been energized, and maintain the open or closed positions until the next pulse.

This maintenance of the open and closed positions makes the memory formed by each relay non-volatile.

While embodiments of the invention have been described in detail, it will be evident that the invention may be embodied otherwise without departing from the spirit and scope of the invention.

As mentioned above, the error detector of monitors critical parameters of the activated devices. This is done in a very specific way of dependence upon the nature of the device to be monitored.

An example of such a device to be monitored by the error detector is a pair of attitude control nozzles. One such pair of nozzles is arranged to generate torques in one or the opposite direction about one of three rotational axes of the satellite. On the whole there may exist six pairs of attitude control nozzles, three primary ones for the three orthogonal rotational axes and three associated redundant ones. In case a small deviation about one axis of the satellite's attitude with respect to its desired attitude occurs the respective attitude control nozzle is fired for a short time to correct this deviation. It may now happen that this nozzle does not shut as requires after this short time but remains open although its electrical input signal commanding the desired opening period has already terminated. In this case the attitude control causes an oppositely directed torque to be generated by the second nozzle of the pair whereby the electrical input signal for this second nozzle is supplied as long as the malfunction of the first nozzle continues. Thus the opening period of the second nozzle is very much longer than in a normal attitude correction operation. The respective electrical input command signals of the activated pair of attitude control nozzles may be the parameters to be monitored by the error detector. This may be done for each nozzle by means of an AND-gate receiving at its one input the nozzle input command signal and at its other input clock pulses and being connected with its output to a counter which is set to a predetermined maximum number of pulses and which begins i.e. to count backwards on receiving the clock pulses at its input from the AND-gate's output enable by a nozzle command signal arriving at the respective input of the AND-gate. If this command signal lasts longer than the predetermined number of pulses the counter reaches zero which is the criterion for the error detector for a malfunction or defect of the monitored pair of attitude control nozzles.

Another example for such a device is an earth sensor. If a satellite carrying an earth sensor is oriented in a correct way in relation to the earth then the earth sensor always has the earth in its field of view. The earth sensor detects the infrared radiation emitted by the earth by means of an opto-electronic transducer element and yields a corresponding voltage signal at its output. This voltage signal may be transmitted as a logical signal 1 to one input of an AND-gate the other input of which is steadily supplied with a logical signal 1, i.e. as long as this earth sensor as one device of a device pair is activated. If the proper orientation of the satellite in relation to the earth is lost then the earth will no longer remain within the earth sensor's field of view, the output signal of the earth sensor falling to zero. This logical signal 0 at the corresponding input of the AND-gate causes its output signal also to become 0. The parameter to be monitored by the error detector is in this case the output voltage of the AND-gate. If this output voltage is a logical 0 then an error is detected. This error is not caused by the earth sensor itself but by another device in the satellite, i.e. a malfunction of a fly wheel. Logical 0 signal at the output of the AND-gate causes the error detector to activate the other memory circuit. At the same time the error detection function of the error detector is disabled and a control program is activated for the satellite to establish an attitude sufficient to maintain the radio link to the earth.

As can be seen from the above it is possible with certain types of devices that upon an error detection message a control program on board the satellite is automatically activated without a telecommand from the earth station to eliminate the defect which caused the error message. At least as long as this control program operates the error detection function of the error detector is disabled. The function may be reactivated after elimination of the defect by a telecommand from the earth.

As becomes evident from the above examples of device monitoring by the error detector the latter must be adapted to the specific nature of the device in question and may be constructed in a very simple manner by means of usual electronic components which are readily available.

What is claimed is:

1. A system for reconfiguring a combination of devices in response to a defect in one of the devices, said combination of devices including a group of primary devices and a respective group of redundant devices, each device in said primary device group forming a device pair with a respective device in said redundant device group, wherein only one device in each pair intended for operation at any instant of time and wherein each primary device and the respective redundant device are intended to perform a desired specific function within a complex arrangement, said system comprising:

a pair of memory circuits, one associated with the group of primary devices and the other with the corresponding group of redundant devices, the memory circuit associated with the primary devices having a non-volatile binary memory for each of the primary devices and the memory circuit associated with the redundant devices having a non-volatile binary memory for each of the redundant devices, the memory for the primary device of each device pair forming a memory pair with the memory of the corresponding redundant device of the same device pair, each memory having only two memory states;

each of said memories having a read line and a pair of set lines, one of said set lines being connected only to said memory and the other of said set lines being also connected to the memory of the corresponding redundant device in the same device pair;

each of said read lines being connected to an associated logic circuit responding to the memory status of its associated memory for furnishing ON commands to one or the other device of the device pair associated with the respective memory;

each of said memory circuits having associated at least one reset line only for its own memories and at least another reset line for its own memories and for the memories of the other memory circuit; and error detection means for monitoring the operation of the devices of the device combination just switched on, and upon occurrence of a defect in one of the monitored device, for deactivating the just action memory circuit and for activating the just inactive memory circuit as well as its associated logic circuits by connecting the memory circuits to the power supply, the error detection means including a plurality of output lines connected to the set lines of the memories.

2. A system as in claim 1, wherein the memories are relays.

3. A system as in claim 1, wherein each memory of said memory circuits includes another read line connected to the other memory circuit.

4. A system as in claim 2, wherein each memory of said memory circuits includes another read line connected to the other memory circuit.

* * * * *